April 10, 1945.  J. C. SIMS, JR  2,373,351
CONTROL FOR UNIVERSAL RESONANT TYPE FATIGUE TESTING MACHINES
Filed Oct. 8, 1942  2 Sheets-Sheet 1

INVENTOR
JOHN C. SIMS, JR.
BY
ATTORNEY

April 10, 1945. J. C. SIMS, JR 2,373,351
CONTROL FOR UNIVERSAL RESONANT TYPE FATIGUE TESTING MACHINES
Filed Oct. 8, 1942 2 Sheets-Sheet 2

INVENTOR
JOHN C. SIMS, JR.
BY
ATTORNEY

Patented Apr. 10, 1945

2,373,351

UNITED STATES PATENT OFFICE 2,373,351

CONTROL FOR UNIVERSAL RESONANT TYPE FATIGUE TESTING MACHINES

John C. Sims, Jr., Philadelphia, Pa., assignor to The Baldwin Locomotive Works, a corporation of Pennsylvania Application October 8, 1942, Serial No. 461,260

4 Claims. (Cl. 73—67)

This invention relates generally to resonant type fatigue testing of materials and it is an object of my invention to provide an improved electrical circuit for exciting the vibration of the specimen and controlling and measuring the amplitude of vibration thereof.

A further object is to provide improved means for obtaining automatic frequency control of the existing system to the natural period of vibration of the specimen so as to compensate for drift of the natural period of the specimen arising from temperature changes and mechanical alteration of the specimen as a result of the applied stress.

Another object is to provide a relatively simple and compact means that is sensitive and accurate in performing the multiple functions of amplitude and frequency control as well as amplitude measurement.

My improved system provides a source of variable frequency control and power for the operation of resonant type fatigue machines. Fatigue strength in a material is that quality which permits it to withstand repeated applications of load without failure. It is usually determined as the highest stress which a material will withstand indefinitely without failure.

Other objects and advantages will be more apparent to those skilled in the art from the following description of the accompanying drawings in which.

Figure 1:
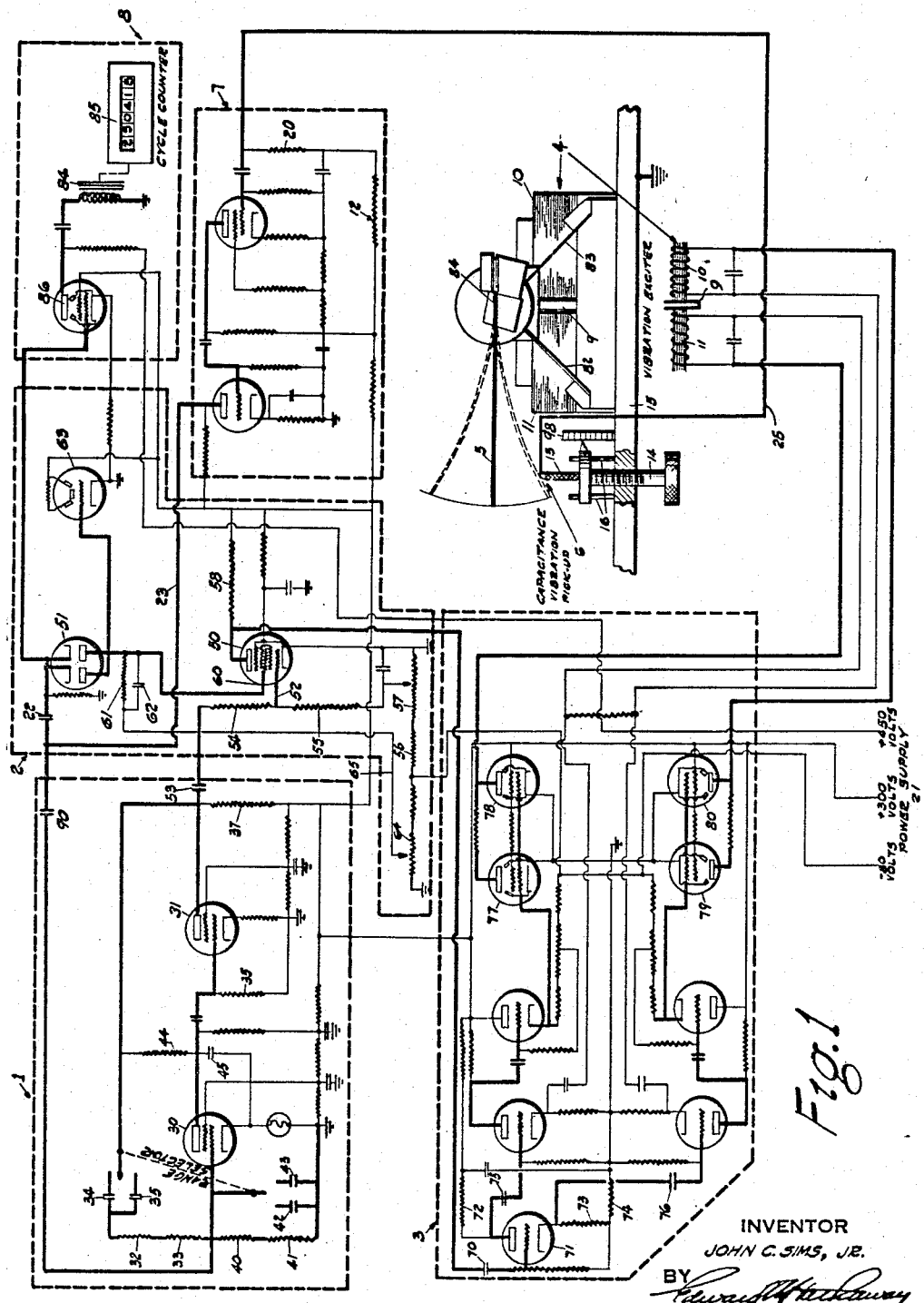
Fig. 1 is a combined mechanical and electrical diagram embodying my invention as applied to flexure fatigue.

My system is of the electronic type and is divided into eight main units. A signal generator or oscillator 1, an automatic electronic control unit 2 for controlling the amplitude of vibration at any predetermined value, an amplifier 3 for increasing the power of the controlled signal, an electro-mechanical converter 4 for changing the electrical oscillation into a mechanical vibration which is applied to a specimen 5 in a manner shown more fully in another application executed and filed of even date herewith entitled Universal resonant type fatigue testing machine, a capacity type vibration pick-up 6, a vibration or control signal amplifier 7 used to amplify the signal obtained from the capacity pick-up 6 and which amplified signal is applied to the control unit 2 as a means of regulating the amplitude of vibration, and a cycle counter 8. The specific specimen 5 as shown herein for purposes of illustration is a flexible member vibrating in cantilever flexure although other types of fatigue specimens and tests may be employed herein.

Figures 2, 3:
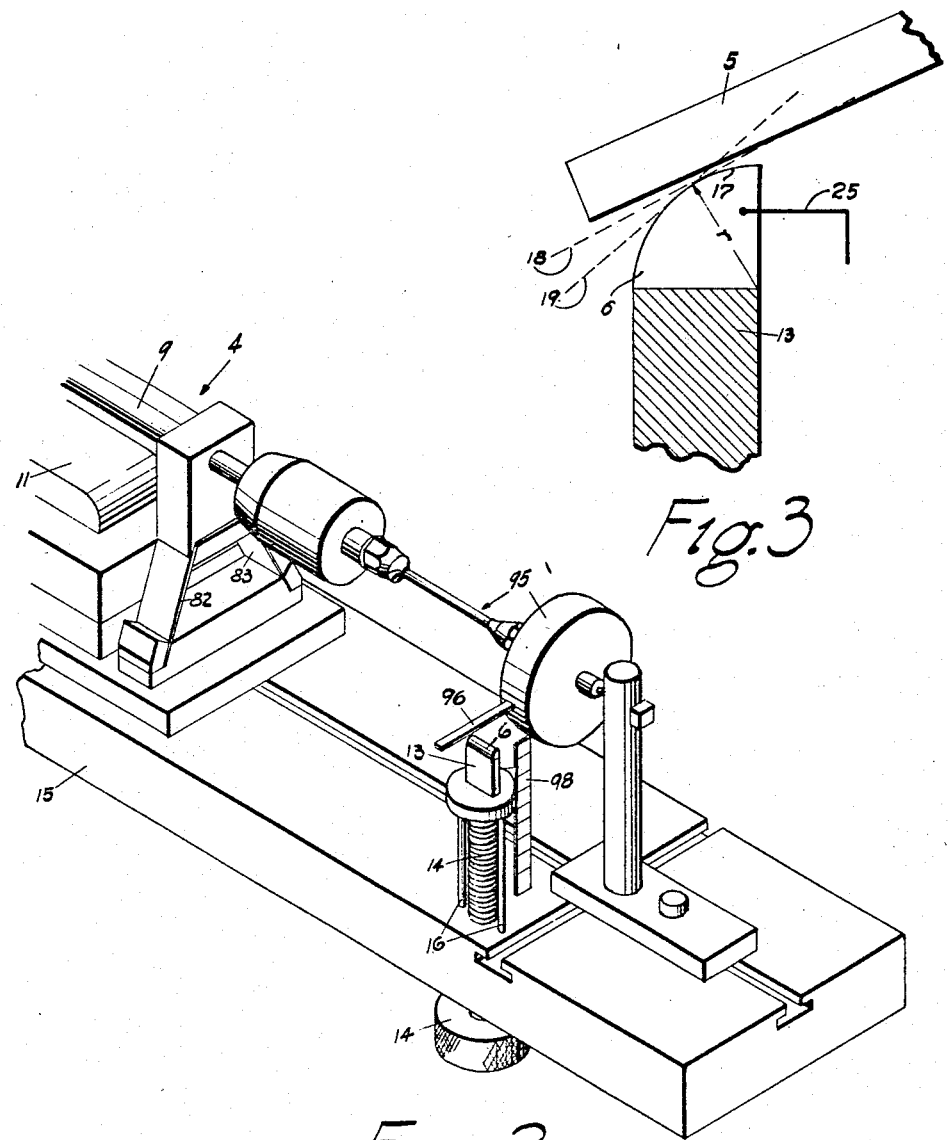
Fig. 2 is a diagrammatic illustration of a torsional fatigue test with which my improved circuit may be used.
Fig. 3 is an enlarged side view of my improved capacity pick-up showing various angles of tangential approach of the specimen to the pick-up.

The general operation of my system is as follows: The signal generator or oscillator 1 is used as a source of sinusoidal power, the frequency of whose vibration may be varied over a wide range to permit it to be tuned to the natural frequency of the specimen 5 under test, specifically from 20 to 120 cycles per second. The specimen 5 is vibrated preferably by being secured to an oscillating plate 9 actuated by an alternating magnetic field generated by two electro-magnets 10 and 11. The magnetic field is established by a signal from the oscillator amplified by the amplifier unit 3. The oscillator unit is a conventional electronic sine wave oscillator having usual stability of operation both as regards amplitude of oscillation and frequency. The oscillator used in my circuit is of the resistance capacity type being tuned by a resistance-capacity network and having 20% or better inverse feedback to increase its inherent stability. To regulate the amplitude of vibration of the specimen 5 at any predetermined value the voltage output of the oscillator is adjusted by the control unit 2. To determine when the desired amplitude of vibration of specimen 5 is obtained, I provide the capacity pick-up 6. The capacity pick-up 6 is a member or button, preferably metal, disposed beneath the outer free end of specimen 5 and mounted upon a suitable piece of insulation 13 which may be raised or lowered by any suitable mechanical means diagrammatically shown as a screw 14 rotatably threaded in a stationary frame 15. The outer end of the specimen constitutes an electrically conductive element movable in accordance with the resonant vibration of the specimen for cooperation with the pick-up 6 so as to form the opposing condenser element of this pick-up. The insulated piece 13 is prevented from rotating by guide pins 16. Rotation of the screw 14 adjusts the elevation of member 13 and pick-up 6. The sensitive surface 17, Fig. 3, of the pick-up may be of any suitable shape but preferably takes the form of a 90° arc of any suitable radius. As a result of this curvature, the pick-up will always present a uniform relationship to the specimen regardless of the angle of approach of the specimen to the pick-up. That is, the specimen will always lie substantially tangential to the curved surface as diagrammatically indicated by the dotted lines 18 and 19. When the specimen has the desired amplitude it will very closely approach the pick-up 6 without actually contacting the same. The closeness with which the specimen approaches the surface 17 will depend upon the sensitivity to which the electrical circuit is adjusted. The capacity pick-up 6 is connected preferably by a shielded wire 25 to the input of amplifier 7. Repeated variations of capacity will occur between the specimen and pick-up button 6 by reasons of the specimen approaching and retreating from the sensitive surface 17 and as a result this pick-up with its condenser action draws a charging signal current through a pair of resistances 12 and 20 of amplifier 7 from a suitable power supply 21. Furthermore, the magnitude of this signal across resistance 20 will vary as the square of the variation of the capacity between the specimen and the pick-up. Thus the signal obtained in this manner will be a function of the amplitude of vibration of the specimen and the signal will be of the same frequency as that at which the specimen is vibrated and will be more or less sinusoidal in shape.

The signal obtained in the foregoing manner is transmitted through the remainder of the amplifier unit 7 which increases the magnitude of the signal obtained to a value sufficiently large to operate the control unit 2. This amplified signal is transmitted from a condenser 22 through a wire 23 to the control unit 2. This control unit will vary the amplitude of the signal delivered by oscillator 1 to amplifier 3 inversely as the magnitude of the signal applied to the control unit 2 from amplifier 7. Inasmuch as the vibration of the specimen is picked-up by capacity pick-up button 6 and fed to the control unit 2, the output of oscillator 1 is inversely controlled. Hence the amplitude of vibration of the specimen will be varied in such a manner as to prevent it from vibrating at an amplitude greater than any given amount predetermined by the mechanical setting of the capacity pick-up 6. The amplitude of vibration of the specimen being a function of the signal introduced into the capacity pick-up 6 will increase in amplitude and approach the setting of the pick-up as the limit. In the event that the amplitude of the specimen increases beyond a desired amount the specimen will then approach the pick-up 6 to such an extent as to increase the signal from the pick-up to the control unit 2 whereupon the control unit 2 will cause oscillator 1 to reduce its output. The reduced output from the oscillator will, in turn, reduce the power applied to magnets 10 and 11 and accordingly reduce the amplitude of vibration of specimen 5. The reduced amplitude of the specimen will effect a corresponding reduction in the signal from the pick-up 6 and accordingly the control unit 3 will now cause oscillator 1 to increase its power output. The system will quickly reach a balanced state where the signal from the pick-up will cause the oscillator to impart just sufficient power to keep the specimen vibrating at the desired amplitude. From the foregoing it will be noted that a complete control loop exists around units 2, 3, 4, 5, 6 and 7 back to 2. The external source of energy to operate the whole loop therefore is supplied by oscillator.

The amplified A. C. pick-up signal obtained from amplifier 7 is used as a means of driving a small synchronous motor attached to a counter device 8 in order to integrate the number of cycles of stress experienced by the specimen in the course of the test. This cycle counter will be in operation only so long as the vibration of the specimen continues and maintains the resulting signal returned through capacity pick-up 6 and amplifier 7 above a predetermined level or amplitude of vibration. Thus when failure of the specimen occurs a reduced signal will appear in the return network which will be insufficiently large to operate the cycle counter.

The following are descriptions of the various electrical units employed in my improved system and most of which per se are well-known in the art but are here described to show specifically how they are interconnected and in some instances supplemented to form my improved system.

*Oscillator 1.*—This device consists of two vacuum tubes operating in such a manner as to generate a sinusoidal voltage whose frequency may be varied by the alteration of certain constants of the electrical circuit. Working in a similar manner to conventional sine wave oscillators this device works on the principle of regeneration. Since regeneration like any driven oscillation either electrical or mechanical is most efficient when the driving signal leads the driven signal by 90°, the frequency of oscillation will be determined by the condition of the feedback network which causes this phase shift. The signal generated by a tube 30 is amplified by a tube 31 and returned to the control grid of tube 30 through resistance 32, 33 and condensers 34 or 35. Furthermore, the phase angle with reference to the control grid of tube 30 of the signal appearing across resistance 36 will be out of phase by 180°. Also with reference to the control grid of tube 30 the signal appearing across a resistance 37 will be out of phase by 360°. Thus the signal feedback from resistance 37 through the network resistances 32 and 33 and condenser 34 or 35 to the control grid of tube 30 must be shifted 90° through this network in order to cause oscillation. This can only occur when the resistance-capacity network is tuned to resonance. This is accomplished by varying resistance 33. A network resistance 40, 41 and condenser 42 or 43 effectively tunes the control grid of tube 30 thus increasing the sharpness of tuning of the oscillating system. This type of arrangement for producing an oscillating voltage is called a multivibrator. A small amount of inverse feedback or degeneration applied to the circuit increases the inherent stability of the system at the expense of amplification. This is accomplished by returning some of the signal from resistance 37, wire 46, resistance 44 and condenser 45 to a 3 watt incandescent lamp used as the bias resistor in the cathode circuit tube 30. This degeneration will render the system less sensitive to power supply fluctuations thus giving a more constant output signal and will also tend to stabilize the frequency of oscillation. If temperature compensated resistors are used for 32, 33, 40 and 41 frequency stability of the oscillator with respect to temperature will be excellent. Thus the signal appearing at condenser 45 will be variable over a range determined by the constants of the networks made up of resistances 32, 33, 40 and 41 and condensers 34, 35, 42 and 43. Furthermore, this frequency will be stable with respect to temperature and will not be badly affected by large fluctuations of power supply voltage.

*Vibration amplitude control unit 2.*—The automatic amplitude control system consisting of tubes 50 and 51 is used as a means of maintaining the amplitude of vibration of the specimen at a constant predetermined value during the course of the test. Tube 50 is a pentagrid type tube having two control grids. To a grid 52 is applied the signal from the oscillator being derived through a condenser 53 and appearing across resistances 54 and 55, a fixed bias of about 6 volts being applied to this grid from the bleeder network of resistances 56 and 57. An amplified replica of the signal applied to grid 52 will appear across resistance 58 as explained earlier. The amount of amplification the signal receives in tube 50 will be a function of the signal applied to a grid 60, the secondary control grid. This is due to the fact that the transconductance of tube 50 will be changed in proportion to the D. C. bias applied to grid 60. If this grid is driven positive toward zero the transconductance, and therefore the resulting gain of this stage, will be increased. Thus if this grid is driven more negative than its initial negative bias the transconductance and resulting gain will be decreased. Thus as the signal across resistance 58 is increased and decreased the amplitude of vibration of the specimen under test will increase or decrease.

The amplitude of the signal feedback from pick-up 6 through amplifier 7 will increase with increased amplitude of vibration of the specimen and vice versa. This signal after being rectified into direct current by tube 51 is applied to the secondary control grid 60 of tube 50 in such a manner that for an increase in specimen vibration and resulting increase in feedback signal there will be an increase in the negative signal applied to grid 60, thus decreasing the amplitude of vibration of the specimen as explained above. Similarly, a decrease in the negative signal returned to grid 60 of tube 50 from pick-up 6 will cause an increase in amplitude of vibration. Therefore, there must be some amplitude of vibration where the amount of feedback from pick-up 6 will be sufficient to balance out the excess gain of oscillator 1. The amplitude of vibration will tend to cause this amount of feedback as it will be the only amount where the control system will be in a condition of stability. This amplitude will be such as to bring the specimen to a constant distance from pick-up 6 on the peak of its stroke. This point of stability will be referred to as the control point. Thus an increase in specimen vibration over this control point for which the pick-up 6 is adjusted will cause a negative signal to be applied to grid 60 of tube 50 thus causing a reduction in amplification and a resulting reduction in specimen vibration. Furthermore, if the amplitude of vibration of the specimen falls below the control point for which the pick-up 6 is adjusted, the return signal on grid 60 will be such as to increase the amplification of tube 50 thus increasing the amplitude of vibration of the specimen. Stability of the foregoing control system is obtained by means of a network resistance 61 and condenser 21. The control signal rectified into direct current by tube 51 will appear across resistor 61 and condenser 62 thus charging up condenser 62 to the operating point. The rate at which condenser 62 can be charged is determined by the size of said condenser and the resistance of tube 51. Since the resistance of the latter is quite low, the charging rate even for large values of condenser 62 will be quite rapid. The discharge rate is determined by resistance 61 since discharge cannot occur through tube 51 which, due to its construction, cannot pass current in any direction except from cathode of plate. If resistance 61 is made quite large, in the order of several megohms, condenser 62 is large in the order of several microfarads, then the discharge time will be large since the time constant of such a circuit in seconds is equal to the product of the capacity and the resistance. This will give the control system an action that is rapid in one direction and highly damped in the other, that is, the control signal can very rapidly reduce the gain of tube 50 and the resulting vibration of the specimen under test. However, the time required for the circuit to increase the gain and resulting vibration is quite long in comparison. This type of time constant is absolutely necessary for the stable operation of the control circuit since if equal time constants were used for reduction and return of the amplitude of vibration instability of the system would result. This is because the specimen under test which appears in the control loop will have a time constant of its own which will be a function of its internal damping and viscous damping with the air. This time constant will vary with every different type of specimen test and this wide variation would detrimentally affect the operation of the control system were it not for the above described shock absorber action in the control circuit.

Working in conjunction with the control system is a cathode ray indicating tube 63. This is used as a means of standardizing the amount of signal feedback to the control circuit. If this signal is standardized in such a manner, then the gap between the vibration specimen and the capacity pick-up will also be effectively standardized at a given clearance. This is necessary since the mechanical adjustment of the capacity pick-up is not only used as a means of adjusting the amplitude of vibration but of measuring it as well. Thus the aforementioned gap must be kept not only small but reasonably constant if errors in the amplitude measurement system are to be eliminated.

To accomplish this, an amplitude control resistance 64 is used to apply an adjustable bias to control grid 60 through the damping network, resistance 61 and condenser 62 through wire 65. This bias will have the effect of accelerating the action of the control system by the voltage applied from the amplitude control 64. That is, the voltage from the control 64 is added to the control signal from pick-up 6 to produce the total control signal appearing on grid 60.

Tube 63 is connected in such a way as to indicate the size of the signal being fed back from pick-up 6, and if the amplitude control 64 is varied, larger or smaller amounts will be fed back. The amplitude control 64 is therefore adjusted in conjunction with the indicator tube 63 to cause a signal of predetermined standardized size to be returned. This assures proper action of the control system and at the same time standardizes the size of the gap appearing between the pick-up 6 and the specimen under test as explained above.

*Power amplifier 3.*—The signal obtained from control unit 2 is fed into a power amplifier 3 for the operation of the electro-mechanical vibrator unit 4. This amplifier consists of four main stages. The first stage receives the controlled signal through a condenser 70 on to the control grid of tube 71. The resulting signal not only appears across its plate resistor 74 but also resistors 73 and 74. These last two are of sufficient magnitude so that the signal appearing at condenser 75 is equal to the signal 76. Furthermore, the signal appearing at condenser 75 will be 180° out of phase with 76. These two signals are used to feed into a type of opposed construction of amplifier generally referred to as push-pull wherein two tubes are caused to work in opposition to each other thereby not only doubling the power obtained but also reducing distortion. Two stages of this type of construction follow, the last one of these stages being used to drive the heavy power tubes 77, 78, 79 and 80. These power output tubes are connected in a push-pull parallel arrangement. The four tubes work together to produce a two phase signal of high power and this signal is applied to coils 10 and 11 of the electro-mechanical vibrator 4.

*Electro-mechanical vibrator 4.*—This device is used as a link for transmitting the electrical power delivered from the amplifier unit 3 to the specimen to be tested. Coils 10 and 11 excited by this amplifier cause alternating magnetic fields to be set up in such a manner as to vibrate a flapper plate 9 supported between the magnets. Each end of this flapper plate is mounted upon a pair of flexure plates 82 and 83 whose lower ends are fixed to base plate 15 and whose upper ends are secured to the flapper shaft 84. The extended center lines of the plates are arranged diagonally to intersect the shaft axis, thus providing a rotary support about a constant axis. Thus the shaft 84 may be excited with rotary vibration which appears at the side of the unit in a suitable head for supporting specimen grips. The specimen may then be excited at its natural period by varying the frequency of the sine wave oscillator of unit 1 until this natural period is reached. The vibrator as above described can also be used to impart alternating torsional stress to a specimen in the manner shown in my said other application. Briefly, this includes a torsion bar and flywheel assembly 95, Fig. 2, which is given a torsional vibratory movement by the rotary vibration of the exciter unit 4. To have this device operate the pick-up 6 in the same manner as the flexure specimen, I provide a finger 96 projecting radially from the flywheel which is positioned so as to approach and retreat from pick-up 6 as a result of the angular movement of the flywheel. The action of the pick-up and actuating system is thereafter the same as for the case of flexure.

*Stress cycle counter 8.*—The amplified A. C. signal obtained from the capacity pick-up unit 6 and amplified by unit 7 is used to operate a suitable synchronous motor 84 of the well-known "Telechron" type which is geared to a cycle counter 85 so that one revolution of the counter represents 1000 cycles of stress applied to the specimen. As can be shown, the amplitude of the controlling signal is a function of the amplitude of the specimen. Thus, just so long as the amplitude of vibration of the specimen is large and maintained by the control tube 50 at its amount the counter 85 will operate from the controlling signal through its driving tube 86 which receives its signal from condenser 22. However, at the time of failure a fatigue crack will have grown through the specimen a sufficient distance to radically change its natural period of vibration. This natural period will increase with a decrease in stiffness while the exciting signal delivered by the sine wave oscillator of unit 1 remains essentially constant in frequency. Hence, the specimen will then drop out of step with the oscillator and be no longer excited by it. Thus at failure a radical and rapid change in amplitude takes place, the amplitude decreasing to a fraction of its original value and the resulting signal from units 6 and 7 decreasing in proportion. This signal then becomes far too small to operate the cycle counter and thus the integrated result appearing on the counter at the time of failure will so remain until it can be noted by the operator.

*Automatic frequency control operation.*—To assure proper tuning of the exciting oscillator 1 to this resonant frequency of the specimen, a method is included for locking the frequency of oscillator 1 to the specimen frequency. This is accomplished by feeding a small portion of the signal obtained from pick-up 6 through wire 18 and amplifier 7, wire 23 and condenser 90 back to the control grid of tube 30 by wire 91. This will have the desired "lock in" effect since the type of oscillator employed will follow any external signal applied to the grid of tube 30 so long as its frequency does not depart radically from that for which the oscillator is tuned. Therefore as long as the oscillator is approximately tuned, it will "lock in" with the specimen to assure efficient and proper operation, but when failure takes place and the specimen's natural period moves away radically from that for which the oscillator is tuned, the oscillator will drop out of step abruptly, thus permitting the cycle counter, unit 8, to recognize failure.

From the foregoing disclosure it is seen that I have provided an improved system of resonant fatigue actuation and control that has a high degree of sensitivity, accuracy and flexibility of operation and is particularly adapted to maintain in a relatively simple manner the amplitude of vibration of a resonant mechanical system at any predetermined value and at the same time automatically compensate through my improved control loop for changes in this mechanical system due to exterior causes affecting frequency of operation, natural period of vibration to said system or the amplitude of said vibration. As a result of my improved control loop I can produce the desired vibration with minimum power for causing the specimen vibration. The external conditions above referred to are, for example, atmospheric temperature changes, damping of the specimen due to variable air currents, increase in internal damping coefficient of the specimen itself due to temperature rise in the specimen or actual change in the structure of the material. A further result of my improved system as heretofore pointed out is that the amplitude of vibration of the system will closely approach pick-up 6 and therefore the actual extent of flexure imposed upon the specimen may be determined by mechanically measuring the elevation of said pick-up 6 through a suitable graduated scale 98. By having this value it is possible to compute the stress existing at the point 84.

It will of course be understood that various changes in details of construction and arrangement of parts may be made by those skilled in the art without departing from the spirit of the invention as set forth in the appended claims.

I claim:

1. A resonant fatigue testing control system comprising, in combination, an electrically actuated exciter mechanism for vibrating a specimen, a capacity pick-up adapted to be disposed relatively close to the specimen during vibration thereof, the portion of the specimen close to the pick-up being of electrically conductive material to constitute an opposing condenser element for the pick-up whereby the capacitance of the pick-up varies in accordance with movement of the specimen with respect to said pick-up, and means controlled by the fluctuations in capacity of the pick-up for controlling the supply of power to said exciter mechanism to maintain said predetermined specimen vibration.

2. A resonant fatigue testing control system comprising, in combination, an electrically actuated exciter mechanism for vibrating a cantilever specimen, a capacity pick-up adapted to be disposed relatively close to the specimen during vibration thereof, the portion of the specimen close to the pick-up being of electrically conductive material to constitute an opposing condenser element for the pick-up whereby the capacitance of the pick-up varies in accordance with movement of the specimen with respect to said pick-up, and means controlled by the fluctuations in capacity of the pick-up for controlling the supply of power to said exciter mechanism to maintain said predetermined specimen vibration, and said pick-up comprising an arcuate surface adapted to present a substantially constant tangential relation to the specimen for different amplitudes of specimen vibration.

3. A resonant fatigue testing control system comprising, in combination, an electrically actuated exciter mechanism for vibrating a cantilever specimen, a capacity pick-up adapted to be disposed relatively close to the specimen during vibration thereof, the portion of the specimen close to the pick-up being of electrically conductive material to constitute an opposing condenser element for the pick-up whereby the capacitance of the pick-up varies in accordance with movement of the specimen with respect to said pick-up, means controlled by the fluctuations in capacity of the pick-up for controlling the supply of power to said exciter mechanism to maintain said predetermined specimen vibration, and means for adjusting the position of said pick-up and thereby controlling the amplitude of specimen vibration.

4. A resonant fatigue testing control system comprising, in combination, an electrically actuated exciter mechanism for vibrating a cantilever specimen, a capacity pick-up adapted to be disposed relatively close to the specimen during vibration thereof, the portion of the specimen close to the pick-up being of electrically conductive material to constitute an opposing condenser element for the pick-up whereby the capacitance of the pick-up varies in accordance with movement of the specimen with respect to said pick-up, means controlled by the fluctuations in capacity of the pick-up for controlling the supply of power to said exciter mechanism to maintain said predetermined specimen vibration, means for adjusting the position of the pick-up, and means for measuring the position of said pick-up thereby to measure the amplitude of specimen vibration.

JOHN C. SIMS, Jr.